United States Patent
Borg

(10) Patent No.: US 7,684,080 B2
(45) Date of Patent: Mar. 23, 2010

(54) ACCOMMODATING CREATIVE WHITE POINT

(75) Inventor: Lars U. Borg, Saratoga, CA (US)

(73) Assignee: Adobe Systems Incorporated, San Jose, CA (US)

( * ) Notice: Subject to any disclaimer, the term of this patent is extended or adjusted under 35 U.S.C. 154(b) by 412 days.

(21) Appl. No.: 11/449,428

(22) Filed: Jun. 7, 2006

(65) Prior Publication Data

US 2007/0285684 A1 Dec. 13, 2007

(51) Int. Cl.
*G06F 15/00* (2006.01)
*G06K 1/00* (2006.01)
*H04N 1/60* (2006.01)
*G06K 15/00* (2006.01)
*H04N 1/40* (2006.01)

(52) U.S. Cl. ........................ 358/1.9; 358/3.23
(58) Field of Classification Search .......... 358/1.9–3.32
See application file for complete search history.

(56) References Cited

U.S. PATENT DOCUMENTS

| | | | |
|---|---|---|---|
| 4,203,671 A | 5/1980 | Takahashi et al. | |
| 4,797,733 A | 1/1989 | Takai et al. | |
| 6,654,491 B1 | 11/2003 | Hidaka | |
| 6,739,767 B2 | 5/2004 | Ikede et al. | |
| 6,754,382 B1 | 6/2004 | Borg | |
| 6,862,012 B1 * | 3/2005 | Funakoshi et al. | 345/88 |
| 7,120,295 B2 * | 10/2006 | Edge et al. | 382/162 |
| 7,289,663 B2 * | 10/2007 | Spaulding et al. | 382/167 |
| 2004/0208363 A1 | 10/2004 | Bergc et al. | |
| 2004/0228525 A1 * | 11/2004 | Krabbenhoft | 382/162 |
| 2005/0078122 A1 | 4/2005 | Ohga | |
| 2005/0134879 A1 | 6/2005 | Fuchs et al. | |
| 2007/0065006 A1 | 3/2007 | Wilensky | |

OTHER PUBLICATIONS

"David Bourgin's Color Spaces FAQ", http://www.scarse.org/docs/color_faq.html, pp. 1-27.

Norman Koren, "Color Management and Color Science: Introduction", printed from Web on Mar. 30, 2004, http://www.normankoren.com/color_management.html, pp. 1-12.

Normal Koren, "Color Management: Implementation part 1: Setup, working color space, anatomy of a profile", printed from Web on Mar. 30, 2004, http://www.normankoren.com/color_management_2.html, pp. 1-14.

Norman Koren, "Color Management: Implementation part 2: Monitor profiling, workflow details", printed from Web on Mar. 30, 2004, http://www.normankoren.com/color_management_2A.html, pp. 1-12.

(Continued)

*Primary Examiner*—Douglas Q Tran
(74) *Attorney, Agent, or Firm*—Fish & Richardson P.C.

(57) ABSTRACT

Methods and apparatus implementing and using techniques for white balancing image data while performing chromatic adaptation. A creative white point corresponding to a visual appearance of white selected for projection of image data can be obtained. A color transform for converting the image data to a device-independent color space can be obtained. A chromatic adaptation matrix can be calculated based on the creative white point and a reference white point. A color profile for white balancing of the image data can be prepared to include the color transform and the chromatic adaptation matrix.

27 Claims, 3 Drawing Sheets

OTHER PUBLICATIONS

Norman Koren, "Color Management: Obtaining ICC profiles and building them with MonocoEZcolor", printed from Web on Mar. 30, 2004, http://normankoren.com/color_management_3.html, pp. 1-12.

Normal Koren, "Color Management: Evaluating color in printers and ICC profiles", printed from Web on Mar. 30, 2004, http://normankoren.com/color_management_4.html, pp. 1-10.

"Specification ICC.1:Sep. 2003, File Format for Color Profiles (Version 4.1.0)", International Color Consortium, 2003, pp. i-ix, 1-112.

P. Kakumanu et al. "Image Chromatic Adaptation using ANNs for Skin Color Adaptation," 2004 ICTAI 2004 16th IEEE International Conference on Tools with Artificial Intelligence—Nov. 15-17, 2004, Piscataway, NJ, USA, IEEE, Nov. 15, 2004, pp. 478-485.

Karungaru, et al. "Skin Color Correction Through Scene Illuminant Estimation Using Neural Networks and Analytical Methods", University of Tokushima, 10 pages.

Storring, et al. "Estimation of the Illuminant Colour From Human Skin Colour", 4th IEEE International Conference on Automatic Face and Gesture Recognition, Grenoble, France, Mar. 26-30, 2000 7 pages.

Storring, et al. "Skin Colour Detection Under Changing Lighting Conditions", 7th Symposium on Intelligent Robotics Systems, Coimbra, Portugal, Jul. 20-23, 1999, 9 pages.

Wyszecki, et al. "Color Science: Concepts and Methods, Quantitative Data and Formulae, 2nd Edition", John Wiley & Sons, 1982, pp. 224-229 and 502-503.

website: http://cambridgeincolour.com/tutorials/white-balance.htm, "Tutorials: White Balance", published on Apr. 10, 2005, pp. 1-7.

"Nikon D2H Skin Tone Problems?" [online] [dated May 28, 2004] http://web.archive.org/web/20040528232214/http:/www.lonestardigital.com/D2H_skin_tones.htm.

"Hue Selective Edit Tool: Using the Built-in Memory Colors" [online] [dated Apr. 23, 2003] http://web.archive.org/web/20030412113902/Http://www.picto.com/UserGuides/icorrectEditLab40/HueSelectToolC.html.

* cited by examiner

ACCOMMODATING CREATIVE WHITE POINT

BACKGROUND

The present disclosure relates to white balancing of image data. White balancing is a method for reducing color casts, so that objects that appear white in one context also appear white in another context. The present disclosure also relates to the performance of white balancing while accommodating a creative white point.

An encoding white point (also known as a device white point, media white point, or color space white point) is the point in a color space to which the color space values are normalized. Typically the encoding white point exists where all of the channels of the encoding device are maximum and equal.

A creative white point is a point in the color space of an encoding device other than the encoding white point selected to represent white. Creative white points are common in cinematography where they are used by a film creator to change the chromaticity perceived by the audience as being neutral. The use of a creative white point can change the apparent light source or mood of an image.

A reference white point (also known as a output white point or a target white point) is a point in a target color space with a predefined color temperature. For example, D50 (also known as daylight 5000K) in the CIE (Commission Internationale de l'Eclairage, AKA International Commission on Illumination) XYZ color space is a common reference white point and corresponds to a chromaticity of x=0.34567 and y=0.35850 for CIE 1931 (X=0.9642, Y=1.0000, Z=0.8249).

SUMMARY

In general, in one aspect, embodiments of the invention feature methods and apparatus including computer program products for white balancing image data while performing chromatic adaptation. A creative white point corresponding to a visual appearance of white selected for projection of image data can be obtained. A color transform for converting the image data to a device-independent color space can be obtained. A chromatic adaptation matrix can be calculated based on the creative white point and a reference white point. A color profile for white balancing of the image data can be prepared to include the color transform and the chromatic adaptation matrix. According to another aspect, a system for processing motion picture film data can include a processor and a computer-readable medium encoding a computer program product operable to perform the operations described.

These and other embodiments can optionally include one or more of the following features. The color transform can be a conversion matrix, a lookup table, or a formula. Obtaining a color transform can include obtaining an encoding white point and RGB primaries corresponding to a device for which the image data is encoded and calculating a conversion matrix based on the encoding white point and the RGB primaries. The device can be a display, a digital video camera, a projector, or a virtual device. The color transform and the chromatic adaptation matrix can be combined into a color space transformation matrix. The color profile can be an ICC profile. The calculation of the chromatic adaptation matrix can use a Bradford transformation, an XYZ scaling transformation, or a von Kries transformation. Motion picture film data can be processed based on the color profile. The creative white point can be calculated based on the motion picture film data. The processed motion picture film data can be sent to an output device. The output device can have a fixed white point or a variable white point. The output device can be a television, a monitor, a printer, or a mobile phone.

Particular embodiments of the invention can be implemented to realize one or more of the following advantages. Embodiments of the invention can avoid time-consuming manual scaling of the RGB (Red Green Blue) channels of an image when performing white balancing while accommodating a creative white point. Additionally, embodiments of the invention can avoid the introduction of a chromatic adaptation error that can occur when white balancing is performed solely by the manual scaling of the RGB channels of an image. For example, embodiments of the invention can avoid hue shifts in saturated colors when performing white balancing. Embodiments of the invention can accommodate the use of a creative white point and allow inter-media conversion of images consistent with the creative white point and chromatic adaptation. Additionally, embodiments of the invention can automate the calculation of a chromatic adaptation matrix and performance of white balancing, speeding and standardizing the process of white balancing. Embodiments of the invention can also enable displaying or printing a creative white point as neutral on an output device thereby removing objectionable color casts. Furthermore, embodiments of the invention can streamline the work flow in digital cinema production.

The details of one or more embodiments of the invention are set forth in the accompanying drawings and the description below. Other features, aspects, and advantages of the invention will become apparent from the description, the drawings, and the claims.

DETAILED DESCRIPTION

Figure 1:
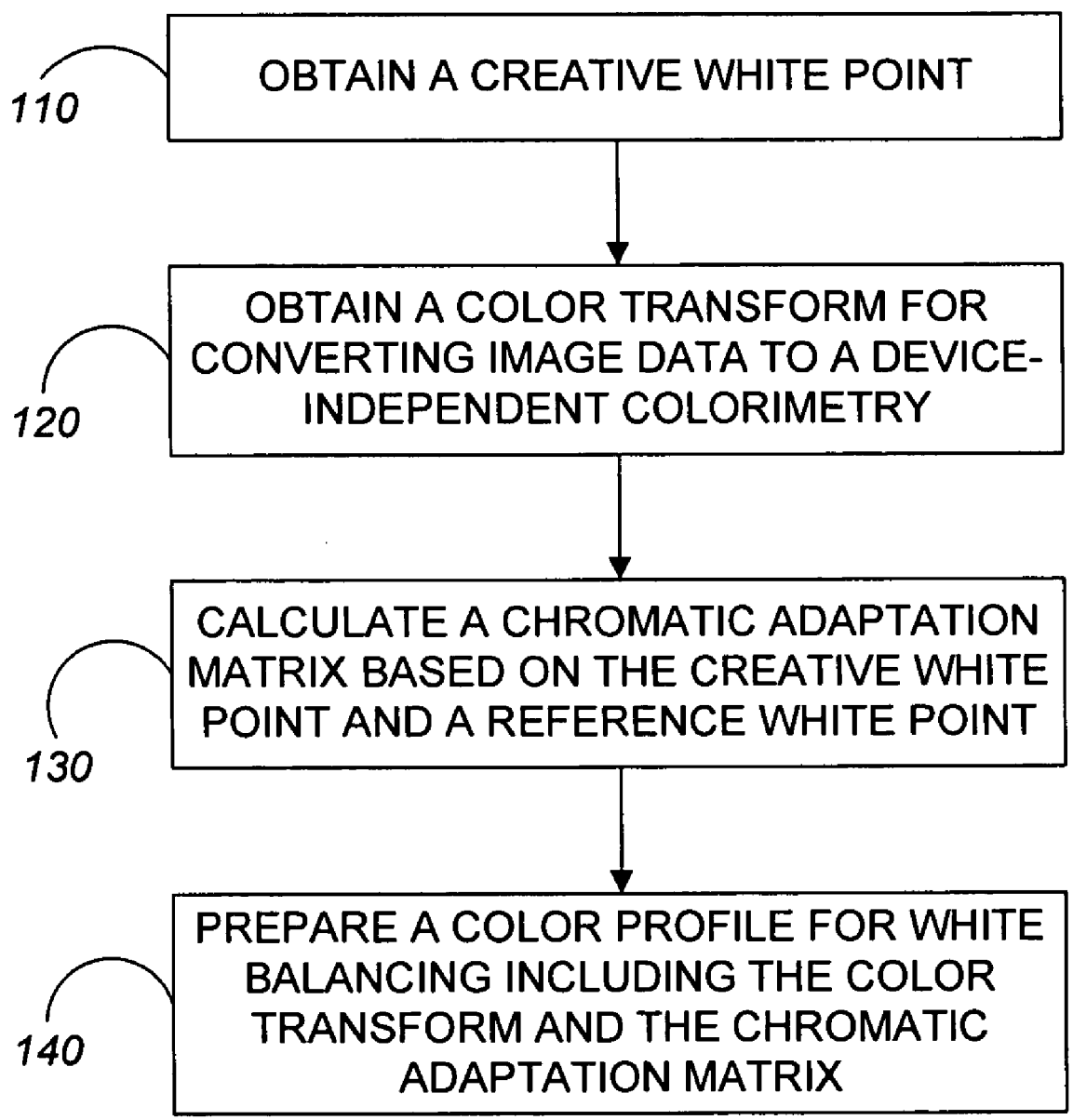
FIG. 1 is flow chart showing an example method for the creation of a color profile to perform white balancing while accommodating a creative white point and performing chromatic adaptation.

FIG. 1 is a flow chart showing an example method for the creation of a color profile to perform white balancing while accommodating a creative white point and performing chromatic adaptation. A creative white point can be obtained (110). For example, the creative white point can be received from another process or can be retrieved from a specified source. A creative white point is a point in a color space selected for projection of image data. The creative white point is perceived by the viewer of the image data as being neutral. The choice of a creative white point can affect the mood or feel of the image data and can change the apparent light source illuminating the image. Creative white points are commonly used in cinematography for these purposes. A creative white point can be measured in a color space or as an xy chromaticity. Examples of color spaces include RGB, CMYK (Cyan Magenta Yellow Black), and XYZ. The creative white point can be received or it can be derived from image data. The creative white point can be calculated based on a portion of the image data which represents a white color. The creative white point can also be chosen by an external means such as user selection or derivation from other image data. The creative white point can also be a previously calculated or chosen value.

A color transform can be obtained (120) for converting image data to a device-independent color space. Examples of a device-independent color space include XYZ. Examples of a color transform include a conversion matrix, a conversion lookup table, and a formula. A conversion matrix can be based on an encoding white point and the RGB primaries corresponding to a device for which the image data is encoded and can convert linearized, non-gamma encoded RGB values to device XYZ values. An encoding white point can be defined in the color space of the device and can be measured as an xy chromaticity. The encoding white point can be received or it can be already known. Examples of devices for which the image data is encoded can include displays, digital video cameras, projectors, and virtual devices. These devices can be the target for which the image data is originally encoded or they can be the source of the image data. Virtual devices can be devices which are represented only by a color space.

A chromatic adaptation matrix can be calculated (130) based on the creative white point and a reference white point. The chromatic adaptation matrix converts values within the XYZ color space (XYZ-XYZ). The reference white point can be received or already known, or a default value, such as CIE D50, can be used. The chromatic adaptation matrix can be calculated based on the Bradford transform, the von Kries transform, or by using XYZ scaling. When using the Bradford transform, for example, the XYZ coordinates of the creative white point are the source XYZ values and the XYZ coordinates of the reference white point are the destination XYZ values. The corresponding matrix equation for the Bradford transform can be found, for example, in the ICC (International Color Consortium) Specification ICC.1:2003-09. By applying this equation to the source and destination values, a chromatic adaptation matrix can be derived.

A color profile including the color transform and the chromatic adaptation matrix can be prepared (140). Typical color profiles include ICC color profiles. The completed color profile can be used to achieve white balancing while accommodating the creative white point and performing chromatic adaptation. By performing chromatic adaptation while accommodating the creative white point, the color selected as white in the original image data (i.e., the creative white point) can be transformed to a known reference white point without inducing hue shifts in saturated colors. After the image data is recalibrated to a reference white point, it can be sent to an output device where the original creative white point can be displayed as white. ICC profiles typically use the Bradford transform and a reference white point of CIE D50.

Optionally, the color transform and the chromatic adaptation matrix can be combined into a single white balancing matrix before preparation of the color profile. The color profile can also include the encoding matrix of the encoding device. The white balancing matrix and the encoding matrix can also be concatenated into one matrix and embedded in the color profile.

The color profile can also be used in conjunction with an output color profile to convert from the reference color space (for example XYZ) to an output color space, such as RGB or CMYK. The two color profiles can be used to display the image data on an output device such as a television, monitor, printer, or mobile phone. Output devices can have a fixed white point or a variable white point. Optionally, the output device can be a computer system that stores the image data before presentation at a later time.

Figure 2:
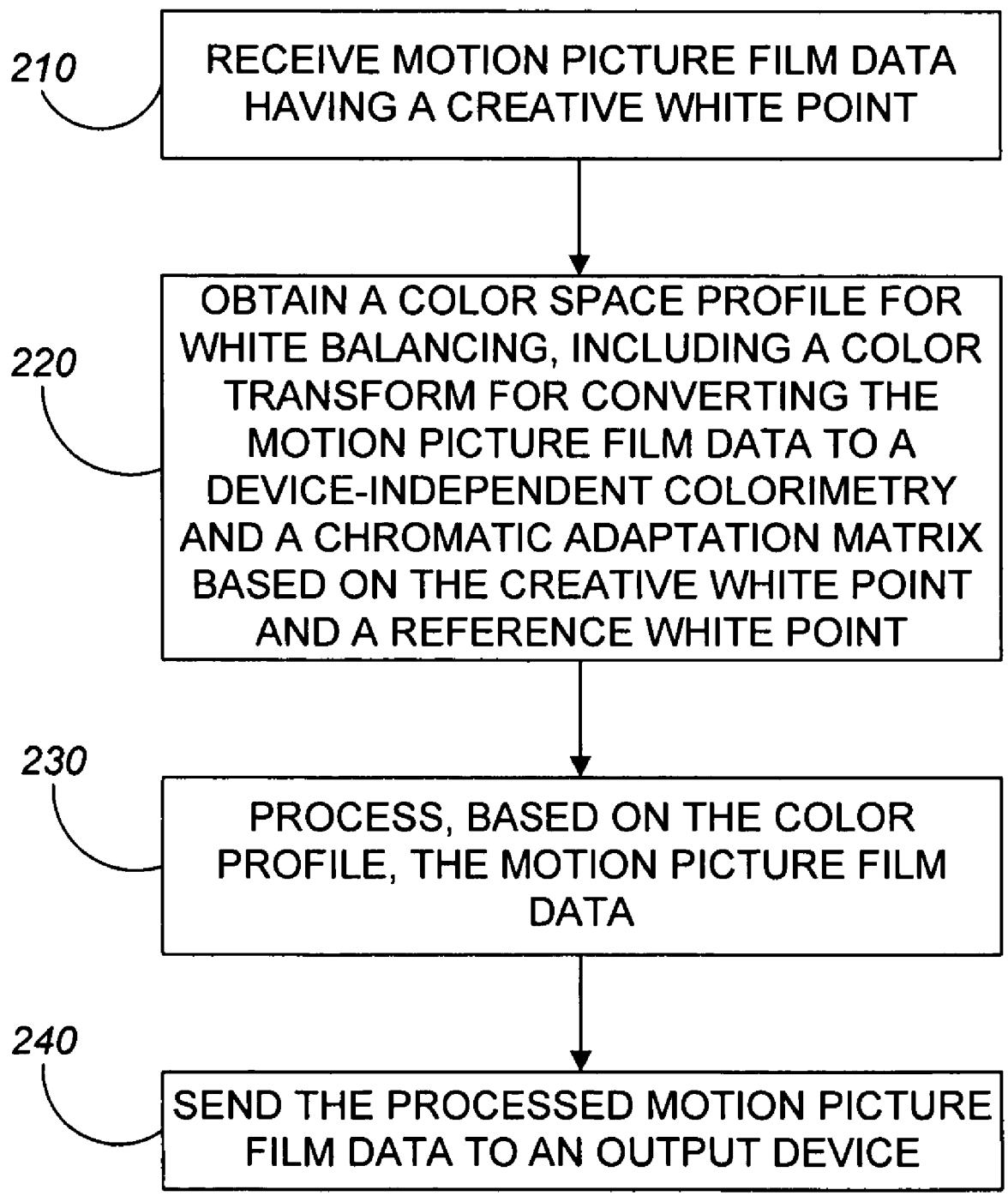
FIG. 2 is a flow chart showing an example method for manipulating motion picture film data to perform white balancing while accommodating a creative white point and performing chromatic adaptation.

FIG. 2 is a flow chart showing an example method for manipulating motion picture film data to perform white balancing while accommodating a creative white point and performing chromatic adaptation. Motion picture film data having a creative white point can be received (210). The creative white point can be derived or calculated from the motion picture film data or it can be independently received. The creative white point can be calculated based on a portion of the image data which represents a white color. The creative white point can also be chosen by an external means such as user selection or derivation from other image data. The creative white point can also be a previously calculated or chosen value.

A color space profile for white balancing can be obtained (220). The color space profile can include both a color transform for converting motion picture film data to a device-independent color space and a chromatic adaptation matrix based on the creative white point and a reference white point. Typical color profiles include ICC color profiles. Examples of a device-independent color space include XYZ. The completed color profile can be used to achieve white balancing while accommodating the creative white point and performing chromatic adaptation. By performing chromatic adaptation while accommodating the creative white point, the color selected as white in the original motion picture film data (i.e., the creative white point) can be transformed to a known reference white point without inducing hue shifts in saturated colors. After the image data is recalibrated to a reference white point, it can be sent to an output device where the original creative white point can be displayed as white.

Optionally, the color transform and the chromatic adaptation matrix can be combined into a single white balancing matrix before preparation of the color profile. The color profile can also include the encoding matrix of the device for which the motion picture film data is encoded. The white balancing matrix and the encoding matrix can also be concatenated into one matrix and embedded in the color profile. The reference white point can be received, already known, or can be a default value such as CIE D50.

The motion picture film data can be processed (230) based on the color profile. The color profile can also be used in conjunction with an output color profile to convert from the reference color space (for example XYZ) to an output color space, such as RGB or CMYK (Cyan Magenta Yellow Black). The output color space can correspond to the color space of an output device. Examples of output devices include televisions, monitors, printers, and mobile phones. Output devices can have a fixed white point or a variable white point.

The processed motion picture film data can be sent (240) to an output device. Examples of output devices include televisions, monitors, printers, and mobile phones. Optionally, the processed motion picture film data can be stored for a predetermined or indefinite length of time before it is sent to an output device. The processed motion picture film data can be stored, for example, in a computer system, a memory device, or a disk device. Optionally, the output device can be a computer system that stores the image data before presentation at a later time.

Figure 3:
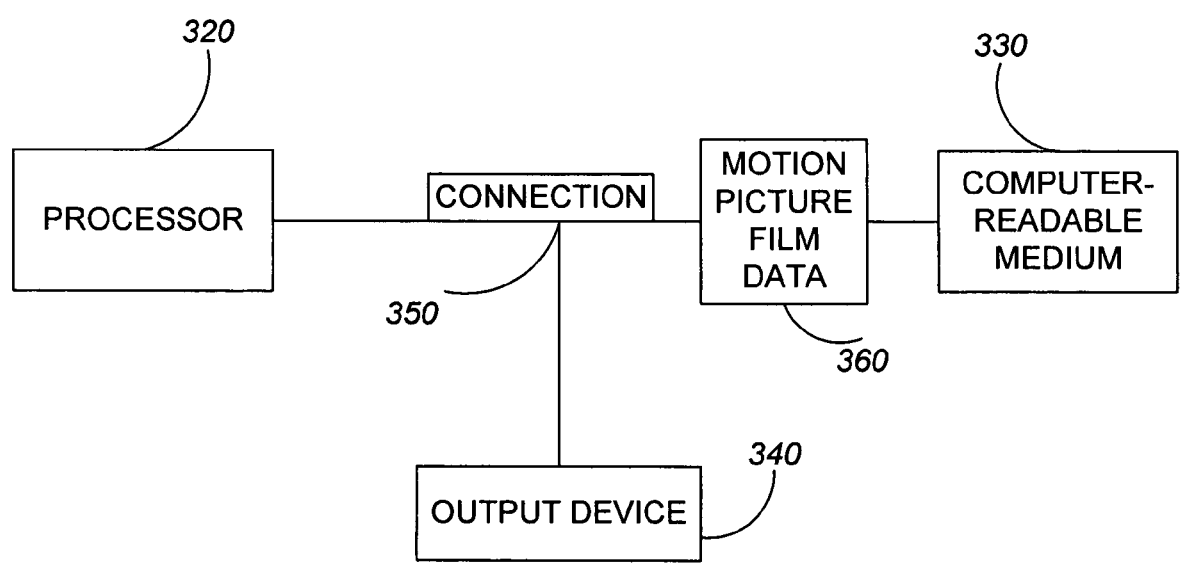
FIG. 3 is a diagram showing an example system for manipulating motion picture film data to perform white balancing while accommodating a creative white point and performing chromatic adaptation.

FIG. 3 is a diagram showing an example system for manipulating motion picture film data to perform white balancing while accommodating a creative white point and performing chromatic adaptation. A computer-readable medium (330) can store a computer program product operable to cause a processor (320) to perform the operations described in connection with FIG. 2. The computer-readable medium (330) can be read-only memory or random-access memory. The processor (320) can be a specific purpose or general purpose microprocessor.

The computer-readable medium (330) and processor (320) can be linked by a connection (350). The connection (350) can include, for example, a system bus, a USB (Universal Serial Bus) bus, a IEEE (Institute of Electrical and Electronics Engineers) 1394 bus, a SCSI (Small Computer System Interface) bus, a local area network, a wide area network, a mobile device network, an internetwork, or a combination of these. The computer-readable medium (330) and processor (320) can be located in the same computer system or in different computer systems.

Motion picture film data (360) can be processed by the processor (320) according to the operations encoded in the computer program product stored in the computer-readable medium (330). The motion picture film data can be stored locally or can be accessible over a network. For example, the motion picture film data can be stored in the computer-readable medium (330). The motion picture film data can be, for example, a movie or short film. The original format of the motion picture film data can be for example, RGB. The motion picture film data can be converted based on a conversion matrix, a lookup table, or a formula.

Optionally, an output device (340) can be linked to the processor (320) via the connection (350). Examples of output devices include televisions, monitors, printers and mobile phones. The output device (340) can have a fixed white point or a variable white point. The output device (340) can also be linked to the computer-readable medium (330) via the connection (350). Optionally, the processed motion picture film data can be stored for a predetermined or indefinite length of time before it is sent to an output device. The processed motion picture film data can be stored, for example, in a computer system, a memory device, or a disk device. Optionally, the output device can be a computer system that stores the image data before presentation at a later time.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method comprising:
   obtaining a creative white point corresponding to a visual appearance of white selected for projection of image data, the image data being encoded for a device having an encoding white point different from the creative white point;
   obtaining a color transform for converting the image data to a device-independent color space;
   calculating a chromatic adaptation matrix based on the creative white point and a reference white point; and
   preparing a color profile for white balancing of the image data, the color profile including the color transform and the chromatic adaptation matrix.

2. The method of claim 1, wherein obtaining a color transform comprises at least one of obtaining a conversion matrix, obtaining a lookup table, and obtaining a formula.

3. The method of claim 1, wherein obtaining a color transform comprises:
   obtaining the encoding white point and RGB primaries corresponding to the device for which the image data is encoded; and
   calculating a conversion matrix based on the encoding white point and the RGB primaries.

4. The method of claim 1, further comprising combining the color transform and the chromatic adaptation matrix into a color space transformation matrix.

5. The method of claim 4, wherein preparing the color profile comprises embedding the color space transformation matrix in a predetermined location of an ICC profile.

6. The method of claim 1, wherein calculating the chromatic adaptation matrix comprises calculating the chromatic adaptation matrix using at least one of a Bradford transformation, an XYZ scaling transformation, and a von Kries transformation.

7. The method of claim 1, further comprising:
   processing, based on the color profile, motion picture film data having the creative white point; and
   sending the processed motion picture film data to an output device.

8. The method of claim 7, wherein obtaining the creative white point comprises calculating the creative white point based on the motion picture film data.

9. The method of claim 7, wherein sending the processed motion picture film data to an output device comprises sending the processed motion picture film data to at least one of an output device with a fixed white point and an output device with a variable white point.

10. The method of claim 7, wherein sending the processed motion picture film data to an output device comprises sending the processed motion picture film data to at least one of a television, a monitor, a printer, and a mobile phone.

11. A computer program product, encoded on a computer-readable medium, operable to cause data processing apparatus to perform operations comprising:
    obtaining a creative white point corresponding to a visual appearance of white selected for projection of image data, the image data being encoded for a device having an encoding white point different from the creative white point;
    obtaining a color transform for converting the image data to a device-independent color space;
    calculating a chromatic adaptation matrix based on the creative white point and a reference white point; and
    preparing a color profile for white balancing of the image data, the color profile including the color transform and the chromatic adaptation matrix.

12. The computer program product of claim 11, wherein obtaining a color transform comprises at least one of obtaining a conversion matrix, obtaining a lookup table, and obtaining a formula.

13. The computer program product of claim 12, wherein obtaining a conversion matrix comprises:
    obtaining the encoding white point and RGB primaries corresponding to the device for which the image data is encoded; and
    calculating a conversion matrix based on the encoding white point and the RGB primaries.

14. The computer program product of claim 11, further comprising combining the color transform and the chromatic adaptation matrix into a color space transformation matrix.

15. The computer program product of claim 14, wherein preparing the color profile comprises embedding the color space transformation matrix in a predetermined location of an ICC profile.

16. The computer program product of claim 11, wherein calculating the chromatic adaptation matrix comprises calculating the chromatic adaptation matrix using a Bradford transformation, an XYZ scaling transformation, or a von Kries transformation.

17. The computer program product of claim 11, further comprising:
processing, based on the color profile, motion picture film data having the creative white point; and
sending the processed motion picture film data to an output device.

18. The computer program product of claim 17, wherein obtaining the creative white point comprises calculating the creative white point based on the motion picture film data.

19. The computer program product of claim 17, wherein sending the processed motion picture film data to an output device comprises sending the processed motion picture film data to at least one of an output device with a fixed white point and an output device with a variable white point.

20. The computer program product of claim 17, wherein sending the processed motion picture film data to an output device comprises sending the processed motion picture film data to at least one of a television, a monitor, a printer, and a mobile phone.

21. A system comprising:
a processor; and
a computer-readable medium encoding a computer program product operable to cause the processor to perform operations comprising:
receiving motion picture film data having a creative white point, the motion picture film data being encoded for a device having an encoding white point different from the creative white point;
obtaining a color space profile for white balancing, including a color transform for converting the motion picture film data to a device-independent color space and a chromatic adaptation matrix based on the creative white point and a reference white point;
processing, based on the color profile, the motion picture film data; and
sending the processed motion picture film data to an output device.

22. The system of claim 21, wherein receiving motion picture film data further comprises receiving the encoding white point and RGB primaries corresponding to the device for which the motion picture film data is encoded.

23. The system of claim 22 wherein obtaining a color transform comprises at least one of obtaining a conversion matrix, obtaining a lookup table, and obtaining a formula.

24. The system of claim 23, wherein obtaining a conversion matrix comprises calculating a conversion matrix based on the encoding white point and the RGB primaries.

25. The system of claim 22, wherein the device comprises at least one of a display, a digital video camera, a projector, or a virtual device.

26. The system of claim 21, wherein the output device has a fixed white point or a variable white point.

27. The system of claim 21, wherein the output device comprises at least one of a television, a monitor, a printer, and a mobile phone.

* * * * *